United States Patent [19]

Itami et al.

[11] Patent Number: 5,069,515
[45] Date of Patent: Dec. 3, 1991

[54] OPTICAL DEFLECTOR OF AIR BEARING TYPE

[75] Inventors: Yukio Itami, Yokohama; Mitsuo Suzuki, Kita; Teruo Ohne, Omiya; Kenichi Hoshi, Yokohama; Eiri Sagae, Atsugi; Yoshio Hashimoto, Tokyo, all of Japan

[73] Assignee: Ricoh Company, Ltd., Tokyo, Japan

[21] Appl. No.: 584,615

[22] Filed: Sep. 19, 1990

[30] Foreign Application Priority Data

| Sep. 22, 1989 [JP] | Japan | 1-245239 |
| Nov. 20, 1989 [JP] | Japan | 1-299660 |
| Jun. 26, 1990 [JP] | Japan | 2-165577 |

[51] Int. Cl.$^5$ .................................. G02B 26/08
[52] U.S. Cl. .................................. 359/200; 310/90; 384/115; 384/123; 359/216; 359/217
[58] Field of Search .................. 350/6.5, 6.7, 6.8; 310/90; 384/115, 123

[56] References Cited

U.S. PATENT DOCUMENTS

| 4,443,043 | 4/1984 | Yamaguchi | 350/6.5 |
| 4,523,800 | 6/1985 | Yamashita et al. | 350/6.7 |
| 4,607,908 | 8/1986 | Ishida | 350/6.8 |
| 4,797,009 | 1/1989 | Yamazaki | 384/115 |

FOREIGN PATENT DOCUMENTS

| 58-50318 | 3/1983 | Japan | 384/123 |
| 2-8511 | 1/1990 | Japan | 384/123 |

Primary Examiner—Loha Ben
Attorney, Agent, or Firm—Oblon, Spivak, McClelland, Maier & Neustadt

[57] ABSTRACT

An optical deflector of an air bearing type has a fixed shaft; a rotary shaft having a hollow portion fitted onto the fixed shaft; a support device disposed between an end portion of the fixed shaft and an end portion of the hollow portion opposite thereto and supporting the rotary shaft in an axial direction thereof; a radial air bearing formed between an inner circumferential face of the hollow portion and an outer circumferential face of the fixed shaft; a polygon mirror fixed to the rotary shaft; a driving device for rotating the rotary shaft; a device for deflecting light irradiated onto the polygon mirror by rotating the rotary shaft through the driving device; a device for forming a flange for fixing the polygon mirror thereto integrally with the rotary shaft; and a device for setting an upper end portion of the support device on a fixed shaft side thereof to be lower than an upper end face of the polygon mirror. The support device has a first magnet directly attached onto an end face of the fixed shaft, a second magnet opposite to the first magnet and attached to the hollow portion of the rotary shaft, and a third magnet opposite to the second magnet and attached to a casing for covering the polygon mirror. Magnetic poles of the first, second and third magnets are opposite to each other to generate magnetic repulsive force.

13 Claims, 11 Drawing Sheets

OPTICAL DEFLECTOR OF AIR BEARING TYPE

BACKGROUND OF THE INVENTION

1. Field of the Invention

The present invention relates to an optical deflector of an air bearing type used in an optical writing device in a laser printer, a digital copying machine, etc. and deflecting a modulated optical signal.

2. Description of the Related Art

An optical deflector of a rotary mirror type using a polygon mirror is widely used in an optical writing device in a laser printer, a digital copying machine, etc. since a large deflection angle is obtained in the optical deflector.

In the optical deflector of this type, a deflection speed depends on the number of rotations of the rotary polygon mirror. Accordingly, to obtain high resolution, it is necessary to rotate the polygon mirror at a high rotational speed such as several ten thousand rpm, e.g., 30,000 rpm. A bearing must have small friction to realize such a high rotational speed so that an air type bearing is generally used.

Japanese Patent Publication (KOKOKU) No. 53-6854 discloses an optical deflector using a rotary mirror and provided with a radial dynamic pressure bearing and a repulsive magnetic thrust bearing. The dynamic air radial bearing pivotally supports a rotary shaft having a polygon mirror fixed to an upper portion thereof by a dynamic air pressure in a radial direction of the rotary shaft. The repulsive magnetic thrust bearing is disposed in a lower portion of the rotary shaft and floats the rotary shaft in an axial direction thereof by magnetic repulsive force of a permanent magnet, thereby pivotally supporting the rotary shaft.

In this optical deflector using the rotary mirror, there is a problem that the rigidity of the repulsive magnetic thrust bearing is weak since this bearing is constructed by a bearing of a simple repulsive type disposed in the lower portion of the rotary shaft. Further, it is necessary to dispose dedicated parts such as a holder, damper parts, etc. to construct the repulsive magnetic thrust bearing. Therefore, the number of parts is increased and the cost of the optical deflector is increased. Further, a space for the repulsive magnetic thrust bearing is increased so that the entire optical deflector is large-sized.

To partially solved such problems, an optical deflector of an air-magnetic bearing type is proposed in Japanese Patent Application No. 62-92048 having the same applicant as this application. In this optical deflector, a repulsive magnetic thrust bearing is disposed between an upper portion of a rotary body, an inner face of an upper wall of a casing and an upper portion of a fixed shaft.

This optical deflector of the air-magnetic bearing type solves a problem about the weak rigidity of a bearing of a simple repulsive type in the optical deflector using a rotary mirror shown in Japanese Patent Publication (KOKOKU) No. 53-6854.

However, in this optical deflector of the air-magnetic bearing type, a thrust bearing arranged in an upper end portion of the rotary shaft extends in the axial direction thereof and the number of parts is increased so that the optical deflector cannot be made compact and the cost thereof cannot be reduced.

Further, in a grinding process of the rotary shaft, it is necessary to attach and detach the rotary shaft from a working machine in the middle of the grinding work of the hollow rotary shaft. Therefore, it takes time to prepare and process the rotary shaft. Further, it is difficult to set right-hand and left-hand portions of a flange to be coaxial with respect to each other. Further, it takes time to perform a blank processing for forming the flange and many portions of a material of the rotary shaft become cut powder after the blanking processing so that there are many unnecessary portions in the material of the rotary shaft.

In addition to this, a polygon mirror is attached to an intermediate portion of the hollow rotary shaft so that an upper space of the rotary shaft is useless and the optical deflector cannot be made compact.

SUMMARY OF THE INVENTION

It is therefore a first object of the present invention to provide an optical deflector of an air bearing type in which the entire optical deflector can be made compact by reducing an axial length thereof and the number of parts can be reduced.

A second object of the present invention is to provide an optical deflector of an air bearing type in which a hollow rotary shaft has a shape capable of performing a forging processing so that manufacturing cost can be reduced.

The above first and second objects of the present invention can be achieved by an optical deflector of an air bearing type comprising a fixed shaft; a rotary shaft having a hollow portion fitted onto the fixed shaft; support means disposed between an end portion of the fixed shaft and an end portion of the hollow portion opposite thereto and supporting the rotary shaft in an axial direction thereof; a radial air bearing formed between an inner circumferential face of the hollow portion and an outer circumferential face of the fixed shaft; a polygon mirror fixed to the rotary shaft; driving means for rotating the rotary shaft; means for deflecting light irradiated onto the polygon mirror by rotating the rotary shaft through the driving means; means for forming a flange for fixing the polygon mirror thereto integrally with the rotary shaft; and means for setting an upper end portion of the support means on a fixed shaft side thereof to be lower than an upper end face of the polygon mirror.

The support means may comprise a first magnet directly attached onto an end face of the fixed shaft, a second magnet opposite to the first magnet and attached to the hollow portion of the rotary shaft, and a third magnet opposite to the second magnet and attached to a casing for covering the polygon mirror. Magnetic poles of the first, second and third magnets are opposite to each other to generate magnetic repulsive force.

The support means can be constructed by a dynamic pressure thrust air bearing disposed at an upper end of the fixed shaft.

The support means can obtain floating force from a rising flow of dynamic pressure air generated by the rotation of the rotary shaft and can support the rotary shaft in a state in which the rotary shaft is separated from the fixed shaft.

The flange can be integrally formed with an end portion of the rotary shaft. The polygon mirror can be fixed to an end portion of the rotary shaft.

In the above-mentioned optical deflector, the polygon mirror is fixed to the hollow rotary shaft and the flange for engaging the polygon mirror therewith is formed at an upper end of the hollow rotary shaft. Otherwise, similar to the polygon mirror disposed in an end portion of the hollow rotary shaft, the flange is integrally formed with the rotary shaft. Accordingly, in both cases, the flange is formed in the end portion of the hollow rotary shaft. Therefore, it is not necessary to detach and reattach the rotary shaft to a working machine after the rotary shaft is once set to the working machine in a manufacturing processing thereof, thereby improving processing efficiency. Further, there is no useless space above the polygon mirror since the upper end portion of the support means is set to be lower than the upper end face of the polygon mirror.

Therefore, in accordance with the present invention, the entire optical deflector can be made compact by reducing an axial length thereof and the number of parts can be reduced. The hollow rotary shaft has a shape capable of performing a forgoing processing so that manufacturing cost can be reduced.

Further objects and advantages of the present invention will be apparent from the following description of the preferred embodiments of the present invention as illustrated in the accompanying drawings.

DESCRIPTION OF THE PREFERRED EMBODIMENTS

The preferred embodiments of an optical deflector of an air bearing type in the present invention will next be described in detail with reference to the accompanying drawings.

Figure 1:
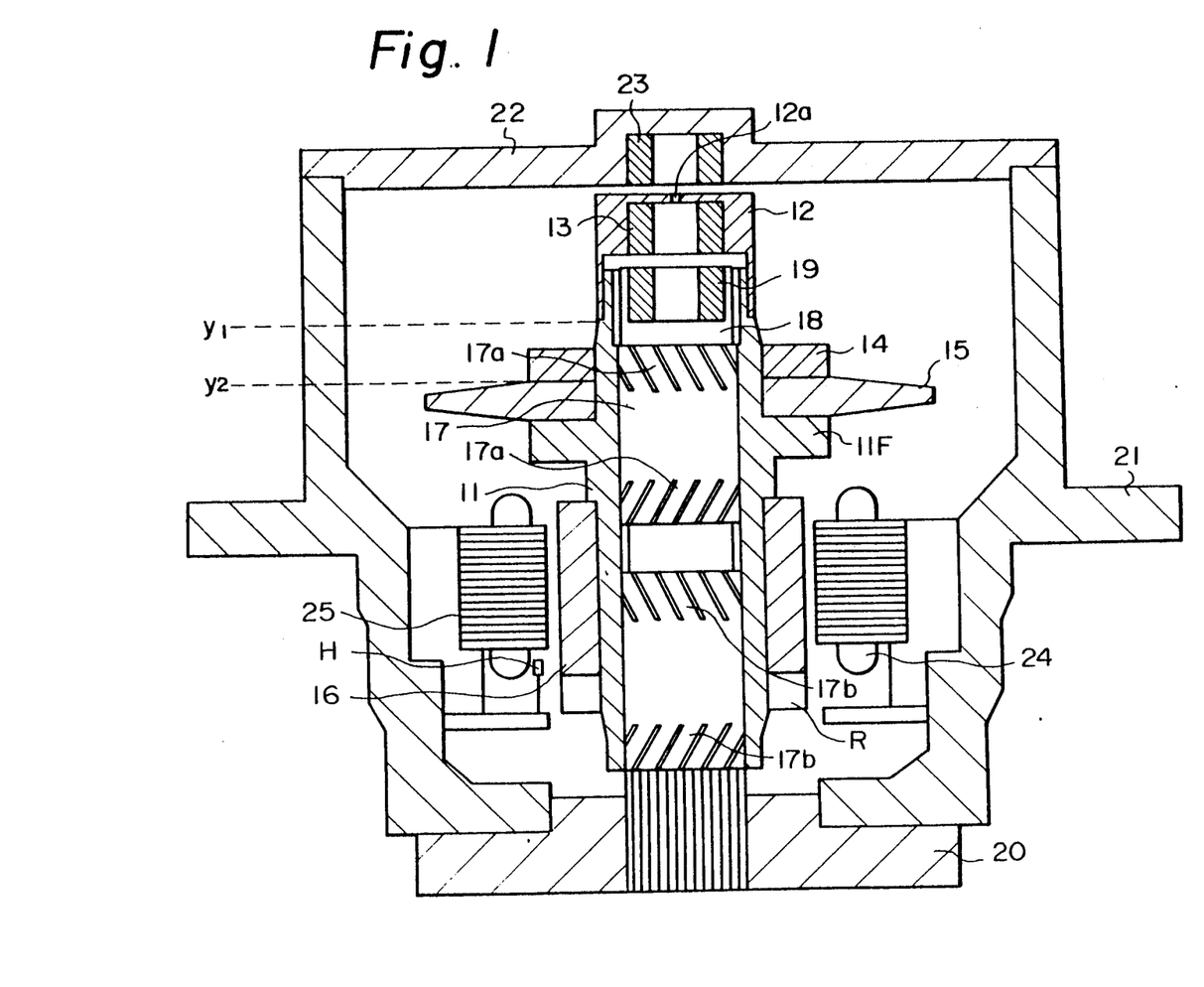
FIG. 1 is a cross-sectional view showing the construction of a general optical deflector of an air-magnetic bearing type.

FIG. 1 is a cross-sectional view showing the construction of a general optical deflector of an air-magnetic bearing type. In this optical deflector, a lower end of a fixed shaft 17 is press-fitted and fixed to a base 20. An upper herringbone groove 17a is formed on an upper circumferential face of the fixed shaft 17 in an axial direction thereof. A lower herringbone groove 17b is formed on a lower circumferential face of the fixed shaft 17 in the axial direction thereof. A holder 18 is fixed onto an upper end face of the fixed shaft 17 and a first magnet 19 is attached to this holder 18. A cylindrical rotary shaft or body 11 is fitted to an outside of the fixed shaft 17 with play therebetween. A rotor magnet 16 is fixed to a lower portion of the rotary shaft 11. A magnet holder 12 is fixed to an upper portion of the rotary shaft 11 and a second magnet 13 is fixed to the magnet holder 12. A small hole 12a is formed on an upper face of the holder 12 to damp a vertical vibration thereof.

A flange 11F is integrally formed with an approximately central portion of the rotary shaft 11. A polygon mirror 15 is arranged on this flange 11F and is fixed to the rotary shaft 11 by a mirror pressing member 14.

A frame 21 is fixed to the base 20 so as to surround the polygon mirror 15. An open face of this frame 21 is covered with a cover 22. A third magnet 23 is fixed to an inner wall of the cover 22 in position opposite to the second magnet 13. A stator yoke 25 is fixed to the frame 21 in a position opposite to the rotor magnet 16.

A motor of an inner rotor type is mainly constructed by the rotor magnet 16 fixed to the rotary shaft 11, the stator yoke (slot iron core) 25 fixed to the frame 21, and a coil portion 24. The polygon mirror 15 is integrally rotated with the rotary shaft 11 by switching magnetizing operations of the motor. Respective opposite faces of the third magnet 23, the second magnet 13 and the first magnet 19 have the same magnetic pole. A thrust magnetic bearing is formed by these magnets 13, 19 and 23. The rotary shaft 11 is floated in an axial direction thereof and is pivotally supported by repulsive force of the second magnet 13 caused by the first and third magnets 19 and 23. A radial dynamic pressure bearing pivotally supports the rotary shaft 11 in a radial direction thereof by a dynamic air pressure increased by the fixed shaft 17 having the upper and lower herringbone grooves 17a and 17b and the rotary shaft 11 opposite to the fixed shaft 17 and rotated in proximity thereto.

A balance spring R for balancing the rotary body is attached to a lower portion of the rotor magnet 16. The mirror pressing member 14 has a function similar to the balancing function of the balance spring R. In FIG. 1, reference numeral H designates a Hall element for detecting the rotation of the rotor magnet 16.

Figure 2:
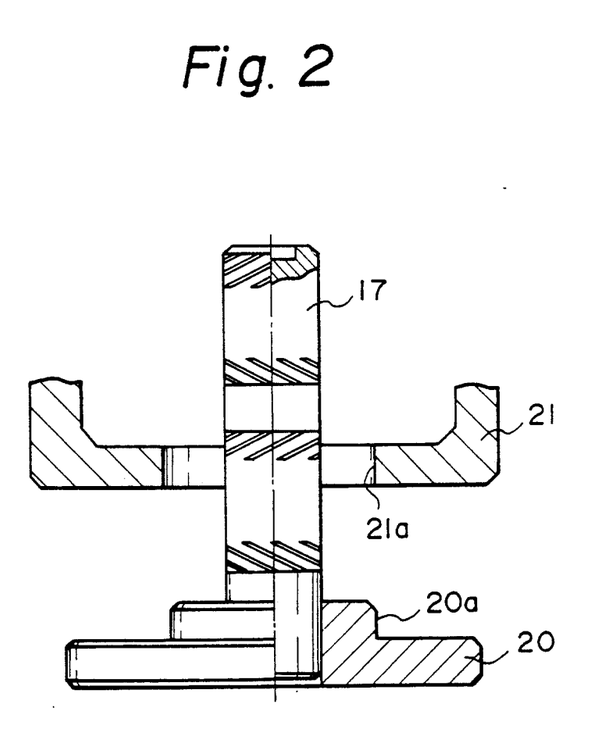
FIG. 2 is a cross-sectional view showing a support structure of a base and a frame shown in FIG. 1.

FIG. 2 is a cross-sectional view showing a support structure of the base and the frame in FIG. 1. A fitting step portion 20a is disposed in the base 20 such that an inner circumferential edge of the frame 21 can be fitted into the fitting step portion 20a. An inner circumferential face of a fitting hole 21a of the frame 21 comes in contact with an outer circumferential face of the fitting step portion 20a.

In this general optical deflector of the air-magnetic bearing type, the polygon mirror 15 is positioned on an outer circumferential face of the hollow rotary shaft 11 finished with high accuracy and is engaged with the flange 11F.

In such an optical deflector, it is necessary to finish the outer circumferential face of the hollow rotary shaft 11 for rotating the polygon mirror 15 at a very high speed with high accuracy such that this outer circumferential face of the rotary shaft 11 is coaxial with respect to an inner circumferential face thereof. The outer circumferential face of the rotary shaft 11 is therefore ground in accordance with an inner diameter standard thereof. Such grinding in accordance with the inner diameter standard is performed to reduce dispersion in respective faces of the polygon mirror 15 in the radial direction thereof and provide an initial unbalancing amount which can be corrected to balance the respective mirror faces.

In this general optical deflector of the air-magnetic bearing type, the repulsive magnetic thrust bearing is constructed such that the second magnet 13 receives respective repulsive forces from the third magnet 23 and the first magnet 19. Accordingly, the rigidity of the optical deflector is strong and it is possible to stably rotate the polygon mirror 15 at a high rotational speed such as 30,000 rpm as mentioned above.

The grinding of the general hollow rotary shaft 11 having the flange 11F in an intermediate position thereof is performed in accordance with the following processes in consideration of the structure of a working machine. Namely, the rotary shaft is first fixed to the working machine and is ground. Then, the rotary shaft is detached from the working machine and attachment directions of the rotary shaft are changed. The rotary shaft is again fixed to the working machine and ground, thereby completing the grinding work.

The optical deflector of the air-magnetic bearing type proposed by the same applicant as this application solves a problem about the weak rigidity of a bearing of a simple repulsive type in the optical deflector using a rotary mirror shown in Japanese Patent Publication (KOKOKU) No. 53-6854.

However, in this optical deflector of the air-magnetic bearing type, a thrust bearing arranged in an upper end portion of the rotary shaft extends in the axial direction thereof and the number of parts is increased so that the optical deflector cannot be made compact and the cost thereof cannot be reduced.

Further, in the above-mentioned grinding processes, it is necessary to attach and detach the rotary shaft 11 from the working machine in the middle of the grinding work of the hollow rotary shaft 11. Therefore, it takes time to prepare and process the rotary shaft. Further, it is difficult to set right-hand and left-hand portions of the flange to be coaxial with respect to each other. Further, it takes time to perform a blank processing for forming the flange and many portions of a material of the rotary shaft become cut powder after the blanking processing so that there are many unnecessary portions in the material of the rotary shaft.

In addition to this, the polygon mirror 15 is attached to an intermediate portion of the hollow rotary shaft 11 so that an upper space of the rotary shaft is useless and the optical deflector cannot be made compact.

Figure 3:
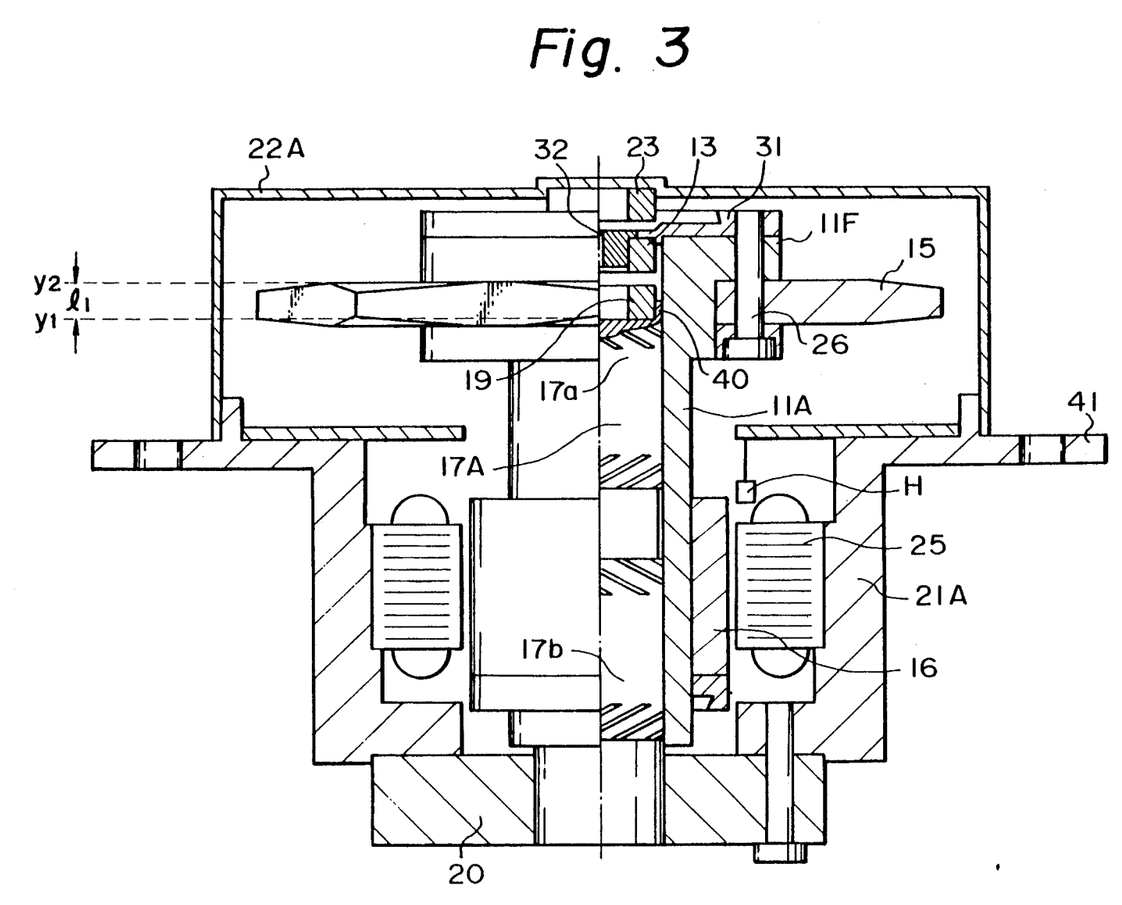
FIGS. 3 to 5 are explanatory views respectively showing the constructions of optical deflectors of an air bearing type in first to third embodiments of the present invention.
Figure 4:
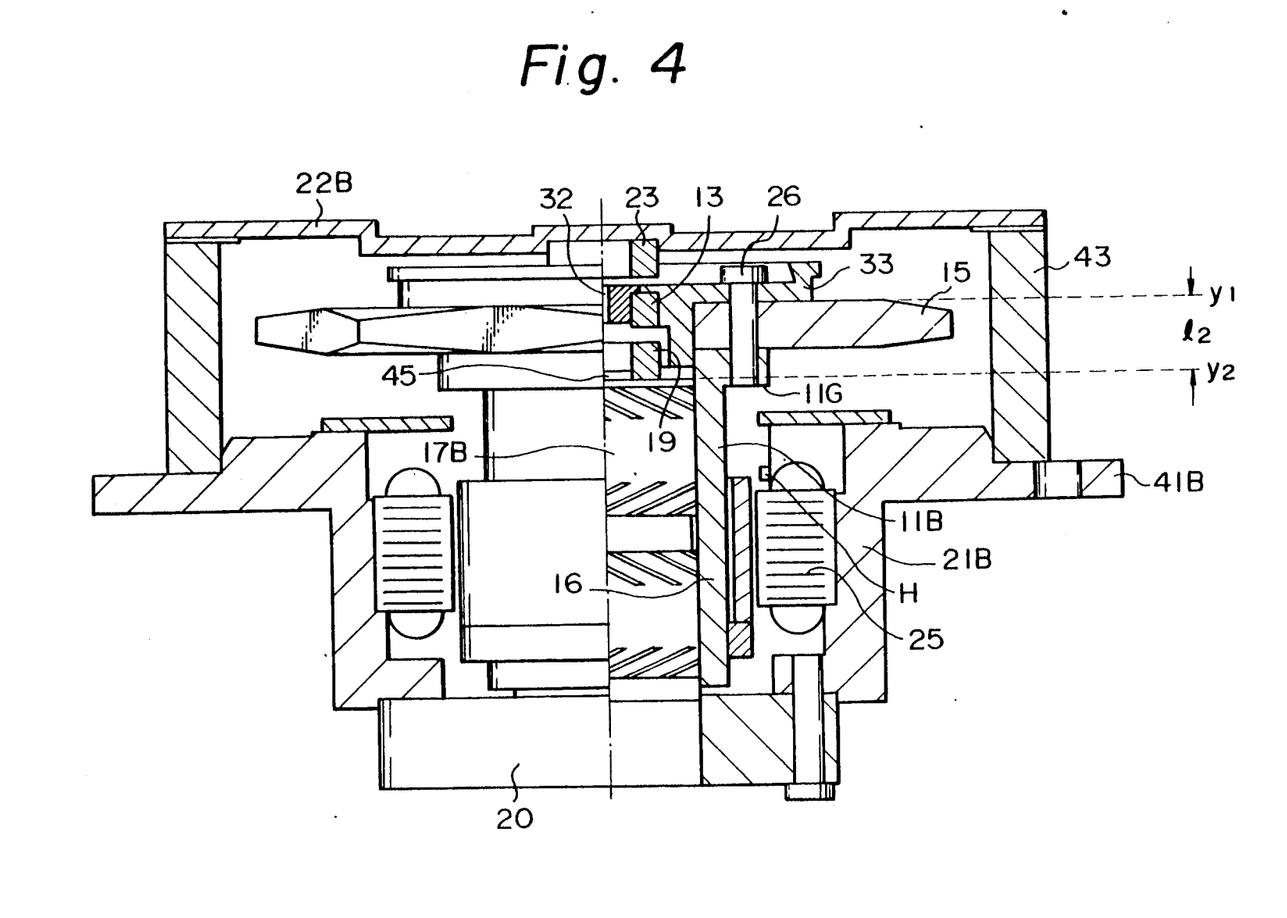
Figure 5:
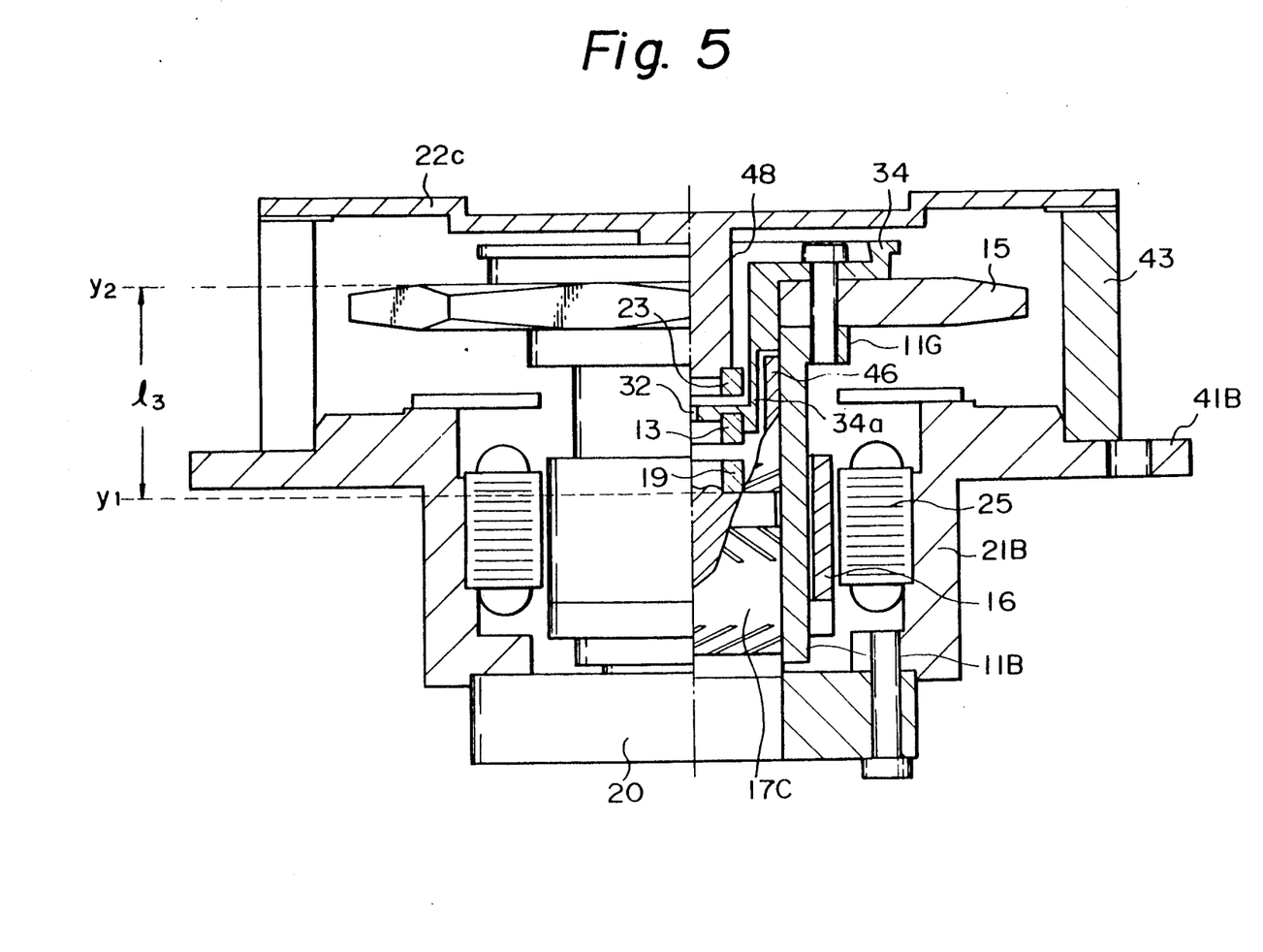
Figure 6:
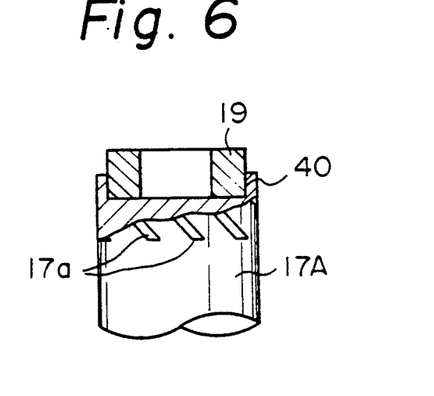
FIGS. 6 and 7 are views for explaining main portions of the optical deflectors respectively shown in FIGS. 3 and 4.
Figure 7:
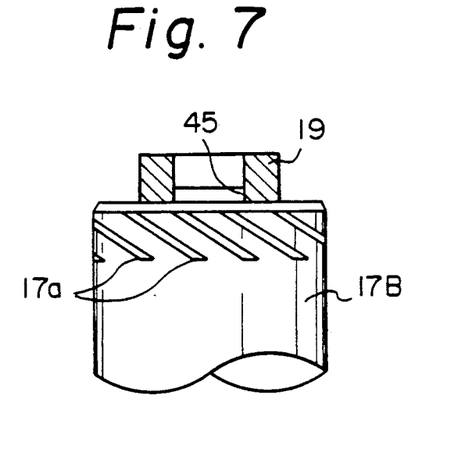

FIGS. 3 to 5 are partially broken explanatory views respectively showing the constructions of optical deflectors of an air bearing type in first to third embodiments of the present invention. FIGS. 6 and 7 are views for explaining main portions in the optical deflectors respectively shown in FIGS. 3 and 4. Constructional portions similar to those in the above-mentioned general optical deflector in FIGS. 1 and 2 are designated by the same reference numerals as those in FIGS. 1 and 2 and a detailed explanation thereof is suitably omitted in the following description.

As illustrated in FIG. 3 showing the optical deflector of an air bearing type in the first embodiment of the present invention, a flange 11F is formed in an upper end portion of a rotary shaft 11A fitted to a fixed shaft 17A with play therebetween. A polygon mirror 15 is fixed by a bolt 26 to the rotary shaft 11A on a lower face of the flange 11F in a state in which the polygon mirror 15 comes in contact with this lower face. A holder 31 is fixed by the bolt 26 to the rotary shaft 11A on an upper face of the flange 11F in a state in which the holder 31 comes in contact with this upper face. As shown in FIG. 6, a recessed portion 40 is formed on an upper end face of the fixed shaft 17A. A first magnet 19 is buried and fixed into the recessed portion 40. A second magnet 13 is fixed to the holder 31 and a small hole 32 for damping a vertical vibration of the holder is formed in a central position of the holder 31.

A flange 41 is integrally formed with an upper portion of a frame 21A fixed to a base 20. A cover 22A of a cap type is fixed to the flange 41. A third magnet 23 is attached to an inner wall of the cover 22A.

Figures 8, 9, 10:
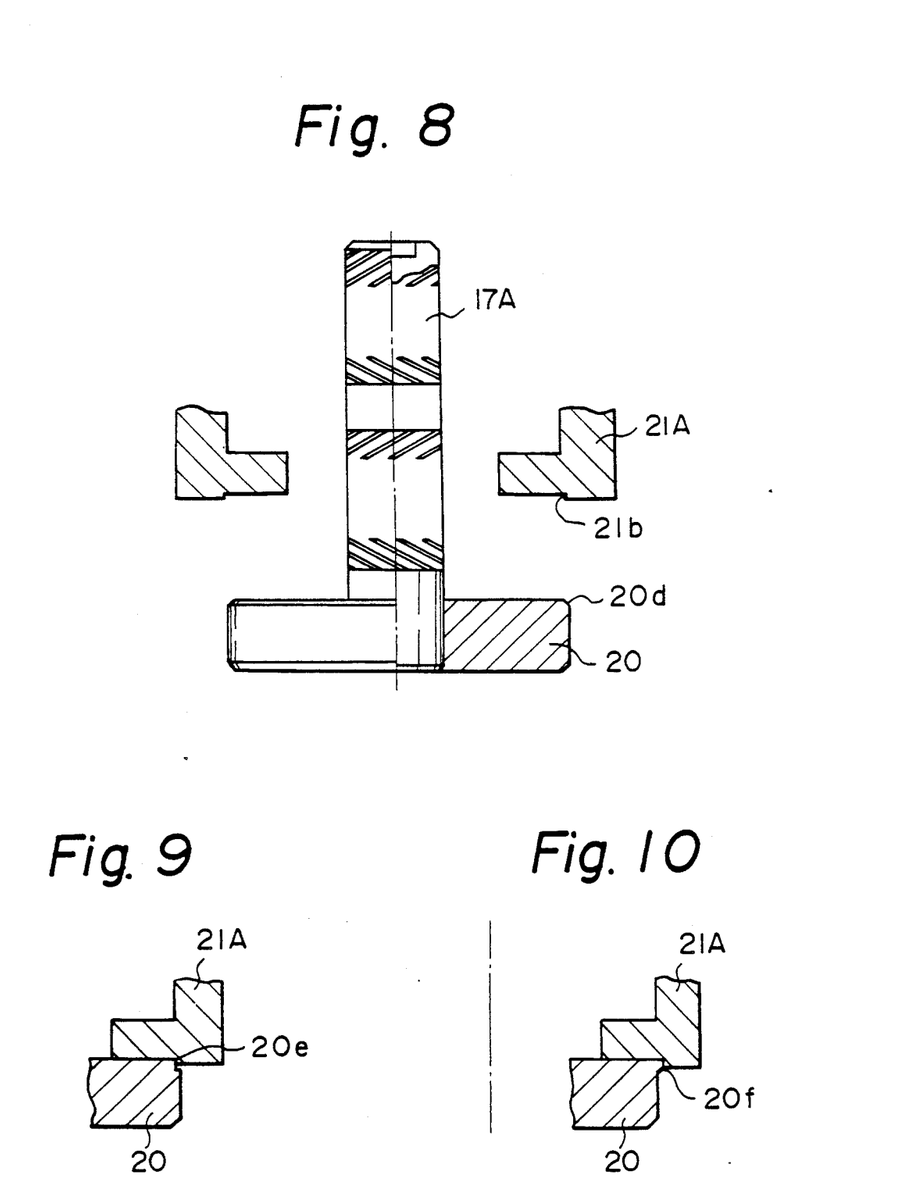
FIG. 8 is a cross-sectional view showing the structure of a base section in each of FIGS. 3 to 5.
FIGS. 9 and 10 are cross-sectional views showing another structure of the base section.

FIG. 8 is a cross-sectional view showing the structure of a base section in the optical deflector in the first embodiment. As shown in FIG. 3, an upper face of the base 20 of the fixed shaft 17A is constructed by a flat face and a lower face of the frame 21A is located on a peripheral portion of this flat face of the base 20. As shown in FIG. 8, a shallow fitting hole portion 21b is formed on the lower face of the frame 21A such that the frame 21A can be fixed to the base 20 in an accurate position thereof. An inner diameter of the fitting hole portion 21b is approximately equal to an outer diameter of the base 20. An entire upper face of the fitting hole portion 21b comes in contact with the upper face of the base 20. A side portion of the fitting hole portion 21b comes in contact with an upper edge of a fitting portion 20d constituting a circumferential face of the base 20.

FIGS. 9 and 10 are cross-sectional views respectively showing another structure of the base section. The base section of the optical deflector in the first embodiment can be constructed by structures shown in FIGS. 9 and 10.

In FIG. 9, a fitting portion 20e in the shape of a groove is disposed at the upper edge of the fitting portion 20d such that a depth of the fitting portion 20e is equal to that of the fitting hole portion 21b and a radial length of the fitting portion 20e is set to be less than 1 mm.

In FIG. 10, a fitting portion 20f is formed by removing a portion coming in contact with an inner circumference of the fitting hole portion 21b from the fitting portion 20d, and cutting and removing a lower portion of the fitting portion 20d in a radial direction thereof such that a radial length of the fitting portion 20d is set to be less than 1 mm.

In such a structure, the base 20 and the frame 21A can be further reliably fitted to each other.

The other constructions of the optical deflector in the first embodiment are similar to those in the general optical deflector of an air-magnetic bearing type shown in FIGS. 1 and 2.

In the first embodiment, the first magnet 19 is directly buried and fitted into the recessed portion 40 of the fixed shaft 17A. Accordingly, it is not necessary to separately dispose a holder for the first magnet 19 so that the number of parts can be reduced.

Further, no separate holder for the first magnet 19 is disposed and the holder 31 of the second magnet 13 is made thin. Therefore, the axial length of the optical deflector is reduced so that the entire optical deflector can be made compact.

In accordance with the first embodiment, the upper face of the base 20 can be made flat so that it is unnecessary to saw a round bar as in the general optical deflector. Therefore, the optical deflector can be manufactured by simply slicing the round bar. As a result, it is easy to manufacture the optical deflector and the cost thereof can be reduced.

FIGS. 4 and 7 show an optical deflector of an air bearing type in a second embodiment of the present invention. In this embodiment, a projected portion 45 is integrally formed with an upper end face of a fixed shaft 17B. A first magnet 19 is fixed to an outer circumference of this projected portion 45. A frame 43 in the shape of a ring is fixed to a flange 41B of a frame 21B. A cover 22B is fixed to the frame 43 so as to cover an open face of this frame 43. A third magnet 23 is attached to an inner wall of this cover 22B.

A rotary shaft 11B is fitted to the fixed shaft 17B with play therebetween and has an axial length slightly longer than that of the fixed shaft 17B. A polygon mirror 15 is disposed on an upper face of a flange 11G formed at an end of the rotary shaft 11B. The polygon mirror 15 is fixed by a bolt 26 to the rotary shaft 11B through a holder 33. A second magnet 13 is fixed to this holder 33.

In the second embodiment, it is easy to perform a processing of the projected portion 45 with respect to an outer diameter thereof in comparison with a processing of the recessed portion 40 with respect to an inner diameter thereof in the first embodiment. Accordingly, it is possible to reduce the manufacturing cost of the optical deflector in comparison with that in the first embodiment.

The other constructions and effects of the optical deflector in the second embodiment are similar to those in the first embodiment shown in FIG. 3.

FIG. 5 shows an optical deflector of an air bearing type in a third embodiment of the present invention. In this third embodiment, a recessed portion 46 is formed on an upper face of a fixed shaft 17C and a first magnet 19 is fixed onto a bottom face of this recessed portion 46. A second magnet 13 is fixed to a holder 34 provided with a cylindrical portion 34a inserted into the recessed portion 46. A third magnet 23 is fixed to a cylindrical portion 48 formed in a central portion of a cover 22C.

In the third embodiment, a thrust bearing is constructed by the first, second and third magnets 19, 13 and 23 and is disposed within the recessed portion 46 of the fixed shaft 17C. The optical deflector can be made compact by reducing the distance between an upper face of a polygon mirror 15 and an upper face of the cover 22C.

The other constructions and effects of the optical deflector in the third embodiment are similar to those in the second embodiment shown in FIG. 4.

In general, in an optical writing device in a laser printer and a digital copying machine using the optical deflector of this type, it is desirable to reduce a space formed above the polygon mirror and a length from the upper face of the polygon mirror and an upper face of the optical deflector.

As mentioned above, in the first to third embodiments, the axial length of the optical deflector can be reduced. The distance between the position y2 of the upper face of the polygon mirror 15 and the position y1 of a lower face of the lower thrust magnet 19 is set to l1, l2 and l3 in the first to third embodiments, respectively. These distances l1, l2 and l3 satisfy the following relation $l1 < l2 < l3$.

Figure 11:
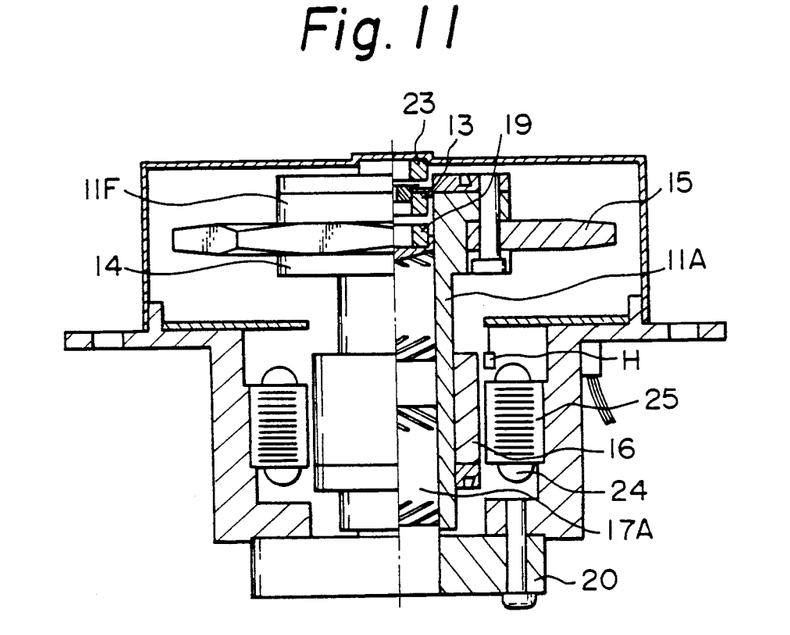
FIGS. 11 and 12 are explanatory views respectively showing the constructions of optical deflectors of an air bearing type in fourth and fifth embodiments of the present invention.

FIG. 11 is an explanatory view showing the construction of an optical deflector of an air bearing type in a fourth embodiment of the present invention. In this embodiment, a flange 11F is also used as a magnet holder and is formed in an upper end portion of a rotary shaft 11A. A polygon mirror 15 is fixedly supported by the flange 11F and a mirror pressing member 14 therebetween.

Figure 12:
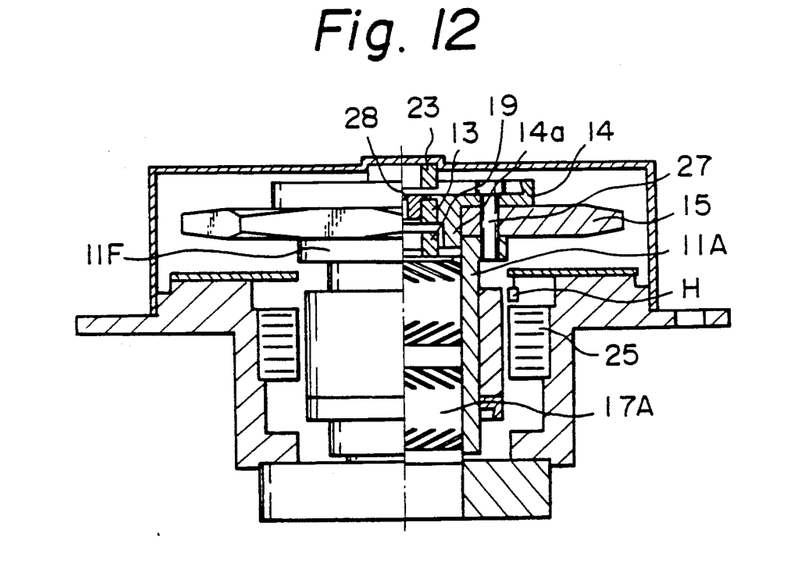

FIG. 12 is an explanatory view showing the construction of an optical deflector of an air bearing type in a fifth embodiment of the present invention. In this embodiment, a flange 11F is formed at an end of a rotary shaft 11A and a polygon mirror 15 is arranged on an upper face of the flange 11F. A mirror pressing member 14 is positioned by fitting an inner cylindrical portion 14a thereof to an inner circumferential portion of the rotary shaft 11A. The polygon mirror 15 is pressed and supported by the mirror pressing member 14 from above. Concretely, a screw 27 is inserted into the mirror pressing member 14 and the polygon mirror 15 and is then screwed into the flange 11F, thereby fixing the polygon mirror 15 to this flange.

In the fifth embodiment shown in FIG. 12, an inner diameter of the hollow rotary shaft 11A is equal to that of the polygon mirror 15. When the inner diameter of the hollow rotary shaft 11A is different from that of the polygon mirror 15, it is possible to cope with such a difference by changing the shape of the inner cylindrical portion 14a of the mirror pressing member 14.

The mirror pressing member 14 holds a magnet 13 and also functions as a magnet holder. A small orifice 28 is formed in a central portion of the mirror pressing member 14 to provide damping characteristics for a thrust bearing.

The other constructions of the optical deflector in each of the fourth and fifth embodiments are similar to those in the first embodiment shown in FIG. 3.

As mentioned above, since the flange 11F is formed in an end portion of the hollow rotary shaft 11A, it is unnecessary to attach and detach the rotary shaft from a working machine in the middle of a blank cutting work or a grinding work for securing concentricity. Accordingly, in working processes, the rotary shaft is fixed to the working machine and is cut and ground, thereby completing the working processes of the rotary shaft. Therefore, a time required to process the rotary shaft can be reduced so that the processing cost of the optical deflector can be reduced. Further, it is possible to forge the rotary shaft when the rotary shaft is shaped. Therefore, an amount of the blank cutting work can be reduced so that it is possible to reduce working time and omit useless materials, thereby reducing manufacturing cost.

Further, an engaging position of the polygon mirror 15 can be set to a higher position so that the optical deflector can be also used in a place in which a space above the polygon mirror is small.

When the mirror pressing member 14 is press-fitted into an inner circumferential portion of the rotary shaft 11A and the polygon mirror 15 and is fixed thereto, it is possible to engage and position the polygon mirror 15 more accurately and simply.

When the mirror pressing member 14 also functions as a magnet holder and the small orifice 28 for damping a vertical vibration is formed, it is possible to reduce the cost of the optical deflector and improve efficiency in assembly and accuracy in positioning of a magnet.

Figures 13, 14:
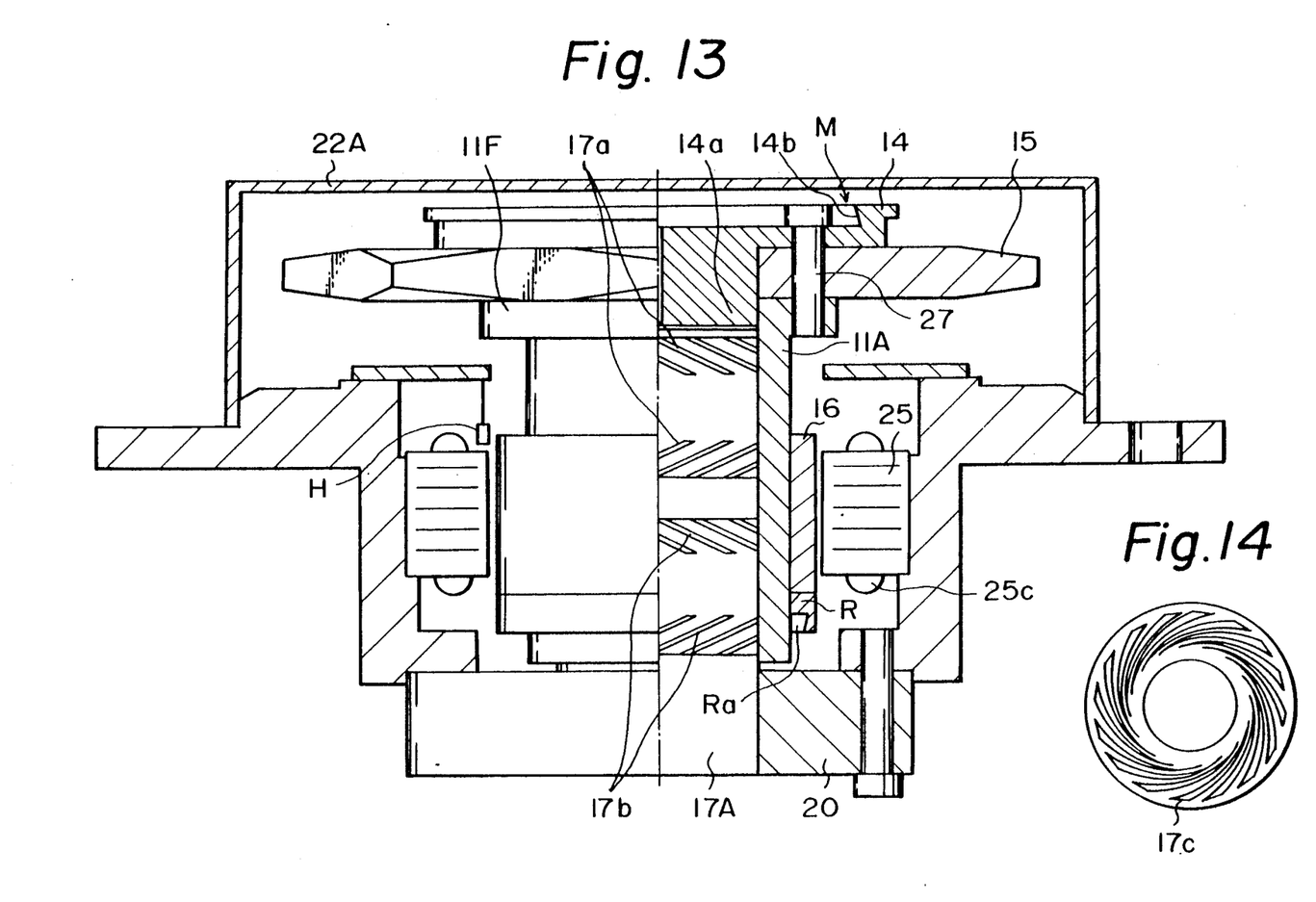
FIG. 13 is an explanatory view showing the construction of an optical deflector of an air bearing type in a sixth embodiment of the present invention.
FIG. 14 is an explanatory view of an upper end face of a fixed shaft in the optical deflector shown in FIG. 13.

FIG. 13 is an explanatory view showing the construction of an optical deflector of an air bearing type in a sixth embodiment of the present invention. FIG. 14 is a view for explaining an upper end face of a fixed shaft in the optical deflector shown in FIG. 13. In this sixth embodiment, an axial repulsive force generating means forming an axial air bearing is not constructed by a magnet, but is constructed by an air dynamic pressure provided in an end portion of the fixed shaft. Namely, a dynamic pressure thrust air bearing is disposed in the end portion of the fixed shaft.

In this sixth embodiment, a polygon mirror 15 is arranged on an upper face of a flange 11F formed at an end of a rotary shaft 11A. A mirror pressing member 14 is positioned by fitting an inner cylindrical portion 14a thereof to an inner circumferential portion of the rotary shaft 11A. The polygon mirror 15 is positioned by the mirror pressing member 14 such that axes of the polygon mirror 15 and the rotary shaft are equal to each other. Thus, the polygon mirror 15 is pressed from above and is engaged with the mirror pressing member 14. Concretely, a screw 27 is screwed into the mirror pressing member 14, the polygon mirror 15 and the flange 11F, thereby engaging and fixing the polygon mirror 15 to this flange. A balance correcting groove 14b for correcting an unbalance of a rotary body is formed in the mirror pressing member 14.

A rotor magnet 16 is fitted to a central portion of the rotary shaft 11A. A balance ring R is attached to a lower portion of the rotor magnet 16 and a balance correcting groove Ra is formed in the balance ring R. Thus, the polygon mirror 15, the mirror pressing member 14, the rotor magnet 16, the balance ring R, etc. are attached to the rotary shaft 11A. This rotary shaft 11A constructs a rotary body M of a polygon scanner of a dynamic pressure air bearing type. This rotary body M is balanced by the upper and lower balance correcting grooves 14b and Ra such that an unbalancing amount of the rotary body M is less than several milligrams so as to reduce a vibration of the rotary body caused by the unbalance thereof when the rotary body is rotated.

A motor section is of an inner rotor type and is constructed by the rotor magnet 16, a stator yoke 25, a coil section 25c, a Hall element H, etc. The rotary body M of the polygon scanner is rotated by switching energizing operations of the motor section.

In the sixth embodiment, a lower end portion of the fixed shaft 17A fitted to the rotary shaft 11A is firmly fixed to a base 20 by a press-fitting method, a shrinkage fitting method, etc. Two pairs of upper and lower herringbone grooves 17a and 17b are formed on outer circumferential faces of the fixed shaft 17A to form a radial bearing.

As shown in FIG. 14, a spiral groove 17c is formed on an upper end face of the fixed shaft 17A to form a thrust bearing. The above radial bearing supports the rotary body M in a radial direction thereof and the thrust bearing supports the rotary body M in an axial direction thereof.

When the rotary body M begins to be rotated, a pressure in a clearance between the rotary shaft 11A and the fixed shaft 17A is increased, thereby forming a radial dynamic pressure air bearing. Further, a pressure in a clearance between an upper end face of the fixed shaft 17A and a lower end face of the mirror pressing member 14 is increased, thereby forming a dynamic pressure thrust air bearing. Thus, the rotary body M is supported by these bearings in the radial and axial directions thereof in a state in which the rotary body M does not come in contact with these bearings.

Figure 15:
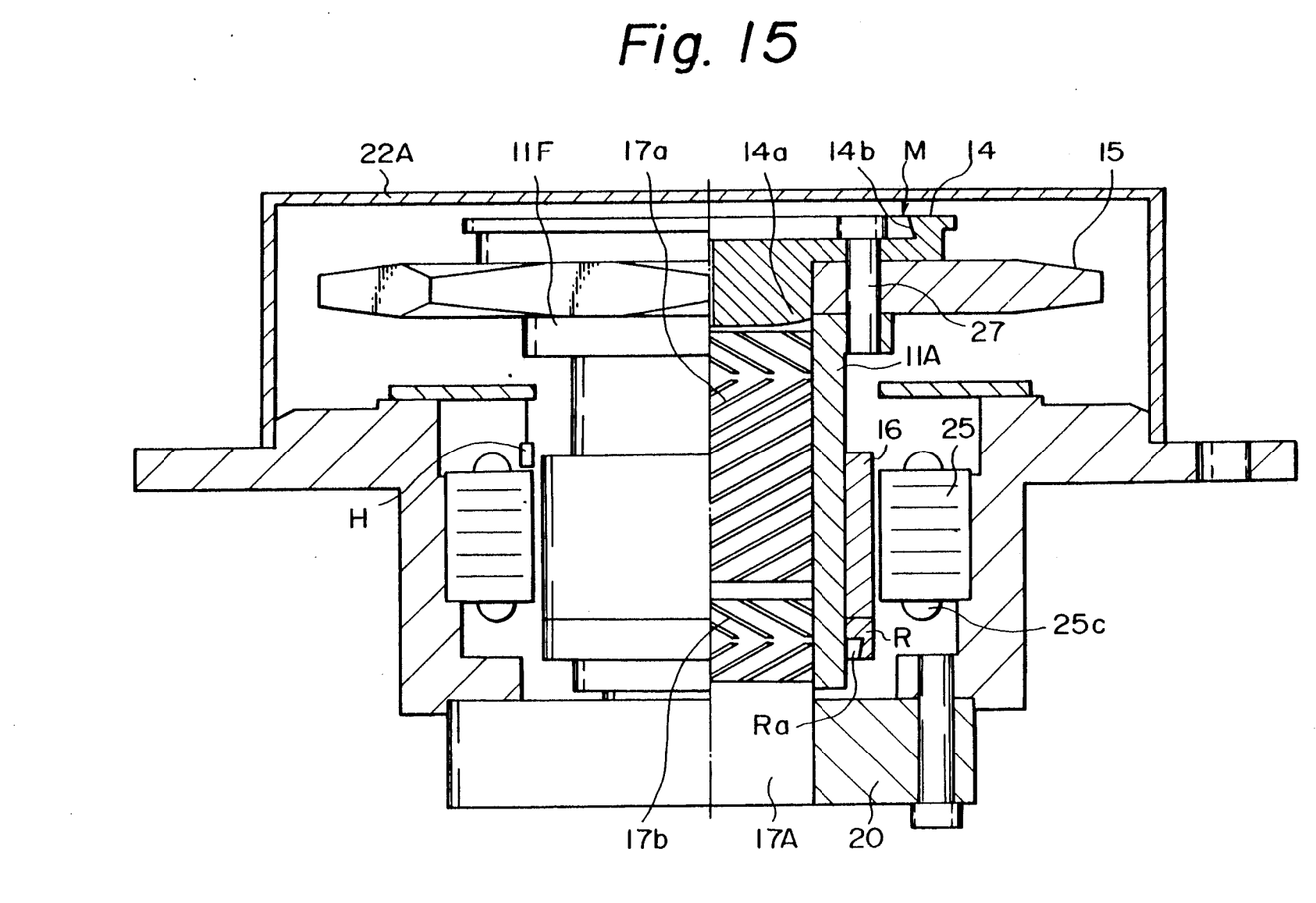
FIGS. 15 and 16 are explanatory views respectively showing the constructions of optical deflectors of an air bearing type in seventh and eighth embodiments of the present invention.

FIG. 15 is an explanatory view showing the construction of an optical deflector of an air bearing type in a seventh embodiment of the present invention. In this embodiment, a fixed shaft 17A is fitted to a rotary shaft 11A with play therebetween and a lower end portion of the fixed shaft 17A is firmly fixed to a base 20 by a press-fitting method, a shrinkage fitting method, etc. Herringbone grooves 17a and 17b are formed on circumferential surfaces of the fixed shaft 17A to form a radial bearing. A lower end of a mirror pressing member 14 constituting a rotary body M is formed in the shape of a spherical face. This spherical face comes in contact with an upper end face of the fixed shaft 17A and is supported by this fixed shaft when the rotation of the rotary body M is stopped.

When the rotary body M begins to be rotated, a pressure in a clearance between the rotary shaft 11A and the fixed shaft 17A is increased, thereby forming a radial dynamic pressure air bearing. Thus, the rotary body M is supported by the radial dynamic pressure air bearing in the radial direction thereof in a state in which the rotary body M does not come in contact with this bearing. Simultaneously, a rising flow of dynamic pressure air is generated by the upper herringbone 17a so that the rotary body M is floated in the axial direction thereof. Thus, the rotary body M is supported by an axial support member in the axial direction thereof in a state in which the rotary body M does not come in contact with this axial support member. The other constructions and operations of the optical deflector in this seventh embodiment are similar to those in the sixth embodiment shown in FIG. 13.

Figure 16:
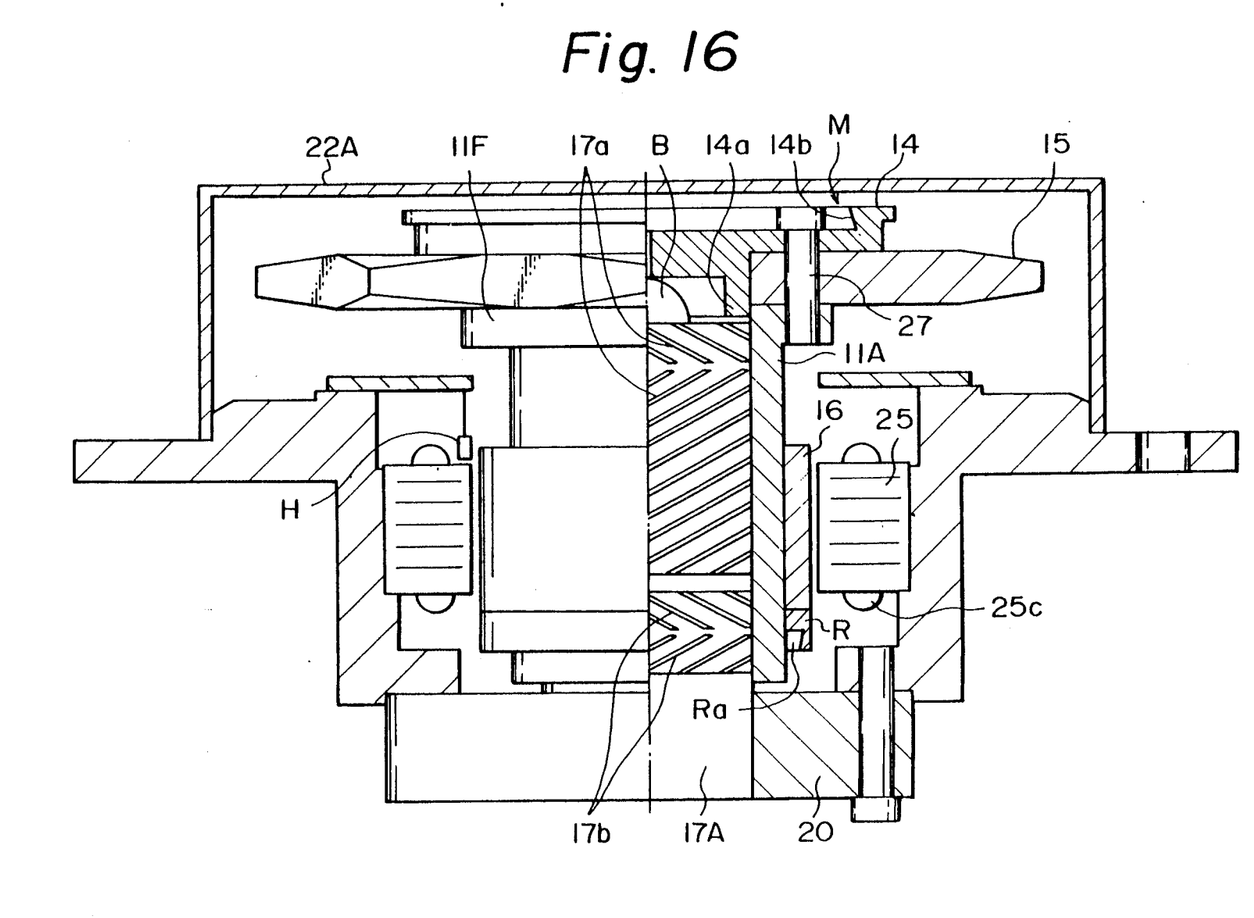

FIG. 16 is an explanatory view showing the construction of an optical deflector of an air bearing type in an eighth embodiment of the present invention. In this embodiment, a fixed shaft 17A is fitted to a rotary shaft 11A with play therebetween and a lower end portion of the fixed shaft 17A is firmly fixed to a base 20 by a press-fitting method, a shrinkage fitting method, etc. Herringbone grooves 17a and 17b are formed on circumferential surfaces of the fixed shaft 17A to form a radial bearing. A ball B is arranged at an upper end of the fixed shaft 17A and comes in contact with a rotary body M to support this rotary body when the rotation of the rotary body M is stopped.

When the rotary body M begins to be rotated, a pressure in a clearance between the rotary shaft 11A and the fixed shaft 17A is increased, thereby forming a radial dynamic pressure air bearing. Thus, the rotary body M is supported by the radial dynamic pressure air bearing in the radial direction thereof in a state in which the rotary body M does not come in contact with this bearing. Further, a rising flow of pressurized air is generated by the upper herringbone groove 17a so that the rotary body M is floated in the axial direction thereof. Thus, the rotary body M is supported by an axial support member in the axial direction thereof in a state in which the rotary body M does not come in contact with this axial support member.

In the above-mentioned sixth to eighth embodiments, the flange 11F is formed at an end of the rotary shaft 11A so that it is not necessary to attach and detach the rotary shaft from a working machine in the middle of a manufacturing processing, thereby reducing processing cost of the optical deflector. The polygon mirror 15 can be positioned by the mirror pressing member 14 such that axes of the polygon mirror and the rotary shaft are equal to each other. Therefore, it is possible to extremely reduce dispersion in reflecting face of the polygon mirror 15.

As mentioned above, the optical deflector of an air bearing type in the present invention has the following effects.

A flange for fixing a polygon mirror thereto is integrally formed with a rotary shaft. An upper end portion of a support means on the side of a fixed shaft is set to be lower than an upper end face of the polygon mirror. In such a structure, it is not necessary to reattach the rotary shaft at a processing time thereof so that it is easy to process the rotary shaft. Further, since the upper end portion of the support means on the fixed shaft side is set to be lower than the upper end face of the polygon mirror, it is possible to minimize a useless space on an upper side of the polygon mirror so that the optical deflector can be made compact.

The support means is constructed by first to third magnets. The first magnet is directly attached onto an end face of the fixed shaft. The second magnet is attached to a hollow portion of a rotary body. The third magnet is attached onto a casing side of the optical deflector. In such a structure, since the first magnet is directly attached onto the end face of the fixed shaft, it is not necessary to dispose a holder for a lower thrust magnet required to be processed with high accuracy. Therefore, it is possible to reduce manufacturing cost of the optical deflector by reducing the number of parts.

The support means can be constructed by a dynamic pressure thrust bearing disposed at an upper end of the fixed shaft. Further, the support means can be constructed by a rising flow of dynamic pressure air generated by the rotation of the rotary shaft. In such a structure, it is unnecessary to attach high parts onto an upper end face of the fixed shaft. Accordingly, it is possible to minimize a useless space on the upper side of the polygon mirror so that the optical deflector can be made compact.

In a structure in which the flange is integrally formed with an end portion of the rotary shaft, it is possible to forge the rotary shaft and a blank processing thereof is simplified. Further, it is not necessary to reattach the rotary shaft to a working machine after the rotary shaft has been once attached to the working machine at a processing time thereof. Therefore, it is possible to improve processing efficiency and reduce the cost of the optical deflector.

In a structure in which the polygon mirror is fixed to an end portion of the rotary shaft, it is possible to minimize a useless space on an upper side of the polygon mirror so that the optical deflector can be made compact.

Many widely different embodiments of the present invention may be constructed without departing from the spirit and scope of the present invention. It should be understood that the present invention is not limited to the specific embodiments described in the specification, except as defined in the appended claims.

What is claimed is:

1. An optical deflector of an air bearing type comprising:
    a fixed shaft;
    a rotary shaft having a hollow portion fitted onto the fixed shaft;
    support means disposed between an end portion of the fixed shaft and an end portion of the hollow portion opposite thereto and supporting the rotary shaft in an axial direction thereof;
    a radial air bearing formed between an inner circumferential face of the hollow portion and an outer circumferential face of the fixed shaft;
    a polygon mirror fixed to the rotary shaft;
    driving means for rotating the rotary shaft;
    means for deflecting light irradiated onto the polygon mirror by rotating the rotary shaft through the driving means;
    means for forming a flange for fixing the polygon mirror thereto integrally with the rotary shaft; and
    means for setting an upper end portion of the support means on a fixed shaft side thereof to be lower than an upper end face of the polygon mirror.

2. An optical deflector as claimed in claim 1, wherein the support means comprises a first magnet directly attached onto an end face of the fixed shaft, a second magnet opposite to the first magnet and attached to the hollow portion of the rotary shaft, and a third magnet opposite to the second magnet and attached to a casing for covering the polygon mirror, and magnetic poles of the first, second and third magnets are opposite to each other to generate magnetic repulsive force.

3. An optical deflector as claimed in claim 1, wherein the support means comprises a dynamic pressure thrust air bearing disposed at an upper end of the fixed shaft.

4. An optical deflector as claimed in claim 1, wherein the support means obtains floating force from a rising flow of dynamic pressure air generated by the rotation of the rotary shaft and supports the rotary shaft in a state in which the rotary shaft is separated from the fixed shaft.

5. An optical deflector as claimed in claim 1, wherein the flange is integrally formed with an end portion of the rotary shaft.

6. An optical deflector as claimed in claim 1, wherein the polygon mirror is fixed to an end portion of the rotary shaft.

7. An optical deflector as claimed in claim 1, wherein the polygon mirror is supported between a mirror pressing member and a flange portion in an upper portion of the rotary shaft.

8. An optical deflector as claimed in claim 1, wherein the optical deflector further comprises means for generating repulsive force in an axial direction of the rotary shaft.

9. An optical deflector as claimed in claim 8, wherein the repulsive force generating means is disposed within a space formed on an inner face of the rotary shaft in an upper portion thereof.

10. An optical deflector as claimed in claim 9, wherein the end portion of the fixed shaft is located below an upper end face of the polygon mirror.

11. An optical deflector as claimed in claim 8, wherein the repulsive force generating means is disposed within a space formed by the hollow rotary shaft and an inner face of a mirror pressing member.

12. An optical deflector as claimed in claim 11, wherein the end portion of the fixed shaft is located below an upper end face of the polygon mirror.

13. An optical deflector as claimed in claim 1, wherein the rotary shaft and the fixed shaft constitute a dynamic pressure air bearing.

* * * * *

UNITED STATES PATENT AND TRADEMARK OFFICE
CERTIFICATE OF CORRECTION

PATENT NO. : 5,069,515

DATED : December 3, 1991

INVENTOR(S) : Yukio Itami et al.

It is certified that error appears in the above-identified patent and that said Letters Patent is hereby corrected as shown below: On the title page The second inventor's residence is incorrect, should be, --Mitsuo Suzuki, Tokyo--.

Signed and Sealed this

Twentieth Day of April, 1993

Attest:

MICHAEL K. KIRK

*Attesting Officer*     Acting Commissioner of Patents and Trademarks